United States Patent
Warwick et al.

(10) Patent No.: US 12,272,136 B2
(45) Date of Patent: Apr. 8, 2025

(54) AGRICULTURAL SYSTEMS AND METHODS USING IMAGE QUALITY METRICS FOR VISION-BASED DETECTION OF SURFACE CONDITIONS

(71) Applicant: CNH Industrial America LLC, New Holland, PA (US)

(72) Inventors: Christopher Nicholas Warwick, Royston (GB); Jason Yip Jee Too, Trumpington (GB)

(73) Assignee: CNH Industrial America LLC, New Holland, PA (US)

( * ) Notice: Subject to any disclaimer, the term of this patent is extended or adjusted under 35 U.S.C. 154(b) by 575 days.

(21) Appl. No.: 17/245,194

(22) Filed: Apr. 30, 2021

(65) Prior Publication Data

US 2022/0350989 A1 Nov. 3, 2022

(51) Int. Cl.
*G06V 20/10* (2022.01)
*A01B 79/00* (2006.01)
*G06V 10/75* (2022.01)

(52) U.S. Cl.
CPC .......... *G06V 20/188* (2022.01); *A01B 79/005* (2013.01); *G06V 10/751* (2022.01)

(58) Field of Classification Search
CPC .. G06V 10/751; G06V 10/993; G06V 20/188; G06V 20/56; G06T 7/0002;
(Continued)

(56) References Cited

U.S. PATENT DOCUMENTS 9,734,400 B2   8/2017   Shriver
10,438,343 B2  10/2019  Baurer et al.
(Continued)

FOREIGN PATENT DOCUMENTS

WO   WO 2014/149496        9/2014
WO   WO-2022038363 A1 *    2/2022   ............. A01B 39/06

OTHER PUBLICATIONS

Taneja P, Vasava HK, Daggupati P, Biswas A. Multi-algorithm comparison to predict soil organic matter and soil moisture content from cell phone images. Geoderma. Mar. 1, 2021;385:114863. (Year: 2021).*

(Continued)

*Primary Examiner* — Vu Le
*Assistant Examiner* — Tracy Mangialaschi
(74) *Attorney, Agent, or Firm* — Rebecca Henkel; Peter K. Zacharias; Rickard K. DeMille

(57) ABSTRACT

In one aspect, an agricultural method for monitoring surface conditions for an agricultural field includes receiving, with a computing system, an image of an imaged portion of an agricultural field, with the imaged portion of the agricultural field being represented by a plurality of pixels within the image. The method also includes identifying, with the computing system, at least one pixel-related parameter associated with the plurality of pixels within the image, determining, with the computing system, whether at least one image quality metric for the image is satisfied based at least in part on the at least one pixel-related parameter, and estimating, with the computing system, a surface condition associated with the agricultural field based at least in part on the image when it is determined that the at least one image quality metric is satisfied.

21 Claims, 6 Drawing Sheets

(58) Field of Classification Search
CPC . G06T 2207/10012; G06T 2207/30168; G06T 2207/10028; G06T 2207/30188; A01B 79/005
See application file for complete search history.

(56) References Cited

U.S. PATENT DOCUMENTS

| | | |
|---|---|---|
| 2007/0003107 A1* | 1/2007 | Wei ..................... G06V 20/10 382/104 |
| 2017/0013181 A1 | 1/2017 | Marcelpoil et al. |
| 2017/0374323 A1* | 12/2017 | Gornik ................ A01B 79/005 |
| 2019/0188847 A1 | 6/2019 | Gonzalez et al. |
| 2019/0379847 A1* | 12/2019 | Ferrari ..................... G06T 7/97 |
| 2019/0392239 A1 | 12/2019 | Ferrari et al. |
| 2021/0088780 A1 | 3/2021 | Henry |
| 2021/0090274 A1 | 3/2021 | Fu et al. |

OTHER PUBLICATIONS

Reigler et al., "Image Processing System for Evaluation of Tillage Quality", Landtechnik—Agricultural Engineering, vol. 69 No. 3, Jun. 30, 2014, (6 pages) https://www.landtechnik-online.eu/landtechnik/article/view/2014-69-3-125-131.
Extended European Search Report issued in EP Application No. 22170590.8 Oct. 7, 2022 (8 pages).

* cited by examiner

AGRICULTURAL SYSTEMS AND METHODS USING IMAGE QUALITY METRICS FOR VISION-BASED DETECTION OF SURFACE CONDITIONS

FIELD OF THE INVENTION

The present subject matter relates generally to the acquisition and analysis of surface condition data associated with an agricultural field and, more particularly, to agricultural systems and methods for vision-based detection of surface conditions associated with an agricultural field that utilize image quality metrics to assess the images captured of the field, thereby improving the reliability/accuracy of the image data ultimately used to estimate the surface conditions.

BACKGROUND OF THE INVENTION

Various sensor-based systems have been developed for use with an agricultural machine to detect or monitor one or more conditions associated with an agricultural field. For example, vision-based systems have been developed in the past to detect or monitor one or more surface conditions (e.g., residue coverage) associated with a field. However, these conventional systems typically suffer from one or more drawbacks. For instance, given that agricultural machines often operate in dirty/dusty environments and/or low-lighting conditions, obtaining reliable, accurate vision-based data is often difficult, particularly when cameras or other imaging devices are being used to acquire images of the field. Dirt and dust can not only soil the exposed optical surfaces of the imaging devices, but can also flow through the field of view of the imaging devices, thereby resulting in images being captured that are difficult to process using computer-vision techniques.

Accordingly, agricultural systems and methods that can improve the reliability of the vision-based data used to estimate one or more surface conditions associated with an agricultural field would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an agricultural system for monitoring surface conditions for an agricultural field. The system includes an agricultural machine configured to travel across an agricultural field, and one or more imaging devices supported relative to the agricultural machine. The imaging device(s) is configured to capture images of the agricultural field as the agricultural machine travels across the agricultural field. The system also includes a computing system communicatively coupled to the one or more imaging devices. The computing system is configured to receive, from the one or more imaging devices, an image of an imaged portion of the agricultural field, with the imaged portion of the agricultural field being represented by a plurality of pixels within the image. The computing system is further configured to identify at least one pixel-related parameter associated with the plurality of pixels within the image, determine whether at least one image quality metric for the image is satisfied based at least in part on the at least one pixel-related parameter, and estimate a surface condition associated with the agricultural field based at least in part on the image when it is determined that the at least one image quality metric is satisfied.

In another aspect, the present subject matter is directed to an agricultural method for monitoring surface conditions for an agricultural field. The method includes receiving, with a computing system, an image of an imaged portion of an agricultural field, with the imaged portion of the agricultural field being represented by a plurality of pixels within the image. The method also includes identifying, with the computing system, at least one pixel-related parameter associated with the plurality of pixels within the image, determining, with the computing system, whether at least one image quality metric for the image is satisfied based at least in part on the at least one pixel-related parameter, and estimating, with the computing system, a surface condition associated with the agricultural field based at least in part on the image when it is determined that the at least one image quality metric is satisfied.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
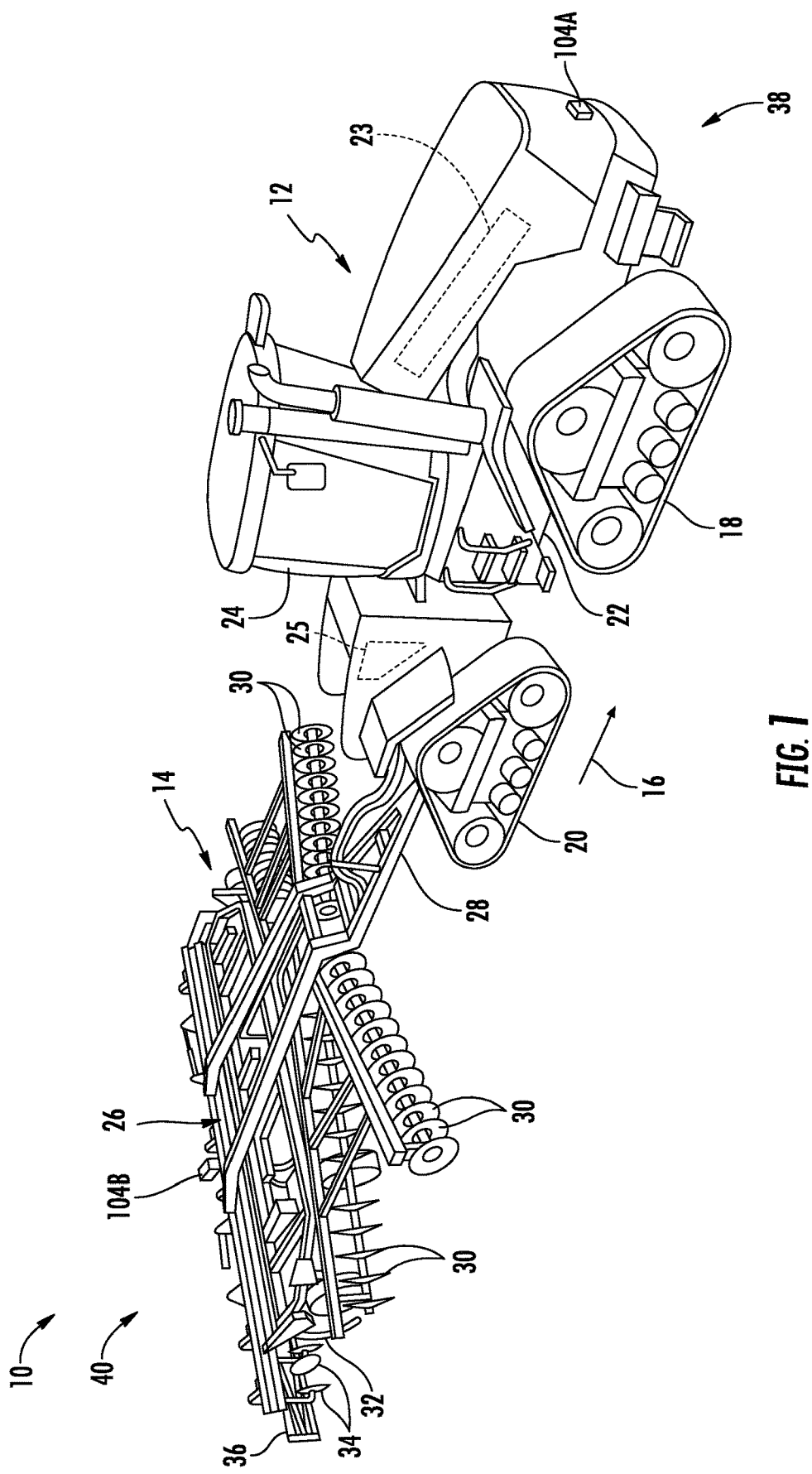
FIG. 1 illustrates a perspective view of one embodiment of an agricultural machine in accordance with aspects of the present subject matter, particularly illustrating the agricultural machine including imaging devices for capturing images of a field across which the machine is being traversed.

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to agricultural systems and methods for monitoring one or more surface conditions within an agricultural field. As will be described below, the disclosed systems and methods utilize computer vision techniques and/or image processing algorithms to estimate the surface condition(s) depicted within an imaged portion of an agricultural field. Specifically, in several embodiments, one or more imaging devices (e.g., a stereo camera assembly) are used to capture/generate images of the field that depict the surface of the field, including two-dimensional images and three-dimensional images of the field surface (e.g., depth images). The images can then be analyzed to estimate one or more surface conditions, such as one or more conditions relating to crop residue (e.g., percent residue coverage, residue size, residue bunches, residue mat height, etc.), soil clods (e.g., clod size/volume, clod count, etc.) and/or surface irregularities (e.g., surface roughness, levelness, including the detection of ridges and/or valleys), and/or the like within the field.

However, given that agricultural machines often operate in dirty/dusty environments and/or in low-lighting conditions, the images captured by the imaging device(s) (and/or the images generated based on the captured images) may often be of insufficient quality to accurately estimate the surface condition(s) associated with the imaged portion of the field. Thus, in accordance with aspects of the present subject matter, the disclosed systems and methods allow for the quality of the images to be automatically evaluated or assessed such that only images of a given quality are used to estimate the relevant surface condition(s). For instance, as will be described below, each candidate image for estimating one or more surface conditions may be analyzed in view of one or more quality metrics to assess the quality of the image. Images determined to be of "low-quality" may be disregarded (e.g., by being discarded or simply ignored) when determining the relevant surface condition(s) within the field. In addition, an operator notification may be generated when it is determined that "low-quality" images are being captured.

Referring now to drawings, FIG. 1 illustrates a perspective view of one embodiment of an agricultural machine 10 in accordance with aspects of the present subject matter. As shown, in the illustrated embodiment, the agricultural machine 10 includes a work vehicle 12 and an associated agricultural implement 14. In general, the work vehicle 12 is configured to tow the implement 14 across a field in a direction of travel (e.g., as indicated by arrow 16 in FIG. 1). In the illustrated embodiment, the work vehicle 12 is configured as an agricultural tractor and the implement 14 is configured as an associated tillage implement. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a planter. Furthermore, it should be appreciated that the agricultural machine 10 may correspond to any suitable powered and/or unpowered agricultural machine (including suitable vehicles and/or equipment, such as only a work vehicle or only an implement). Additionally, the agricultural machine 10 may include more than two associated vehicles, implements, and/or the like (e.g., a tractor, a planter, and an associated air cart).

As shown in FIG. 1, the work vehicle 12 includes a pair of front track assemblies 18, a pair or rear track assemblies 20, and a frame or chassis 22 coupled to and supported by the track assemblies 18, 20. An operator's cab 24 may be supported by a portion of the chassis 22 and may house various input devices for permitting an operator to control the operation of one or more components of the work vehicle 12 and/or one or more components of the implement 14. Additionally, as is generally understood, the work vehicle 12 may include an engine 23 and a transmission 25 mounted on the chassis 22. The transmission 25 may be operably coupled to the engine 23 and may provide variably adjusted gear ratios for transferring engine power to the track assemblies 18, 20 via a drive axle assembly (not shown) (or via axles if multiple drive axles are employed).

Additionally, as shown in FIG. 1, the implement 14 may generally include a carriage frame assembly 26 configured to be towed by the work vehicle 12 via a pull hitch or tow bar 28 in the direction of travel 16 of the vehicle 12. As is generally understood, the carriage frame assembly 26 may be configured to support a plurality of ground-engaging tools, such as a plurality of shanks, disk blades, leveling blades, basket assemblies, tines, spikes, and/or the like. For example, in the illustrated embodiment, the carriage frame assembly 26 is configured to support various gangs of disc blades 30, a plurality of ground engaging shanks 32, a plurality of leveling blades 34, and a plurality of crumbler wheels or basket assemblies 36. However, in alternative embodiments, the carriage frame assembly 26 may be configured to support any other suitable ground engaging tools and/or combination of ground engaging tools. In several embodiments, the various ground-engaging tools may be configured to perform a tillage operation or any other suitable ground-engaging operation across the field along which the implement 14 is being towed. It should be understood that, in addition to being towed by the work vehicle 12, the implement 14 may also be a semi-mounted implement connected to the work vehicle 12 via a two point hitch (not shown) or the implement 14 may be a fully mounted implement (e.g., mounted the work vehicle's 12 three point hitch (not shown)).

It should be appreciated that the configuration of the agricultural machine 10 described above and shown in FIG. 1 is provided only to place the present subject matter in an exemplary field of use. Thus, it should be appreciated that the present subject matter may be readily adaptable to any manner of machine configuration, including any suitable work vehicle configuration and/or implement configuration. For example, in an alternative embodiment of the work vehicle 12, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 14, 16. Similarly, as indicated above, the carriage frame assembly 26 of the implement 12 may be configured to support any other suitable combination of type of ground-engaging tools.

Furthermore, in accordance with aspects of the present subject matter, the agricultural machine 10 may include one or more imaging devices 104 coupled thereto and/or supported thereon. Each imaging device(s) 104 may, for example, be configured to capture images or other data relating to one or more conditions of the field along which the machine 10 is being traversed. Specifically, in several embodiments, the imaging device(s) 104 may be used to collect data associated with one or more surface conditions of the field, such as one or more conditions relating to crop residue (e.g., percent residue coverage, residue size, residue bunches, residue mat height, etc.), soil clods (e.g., clod size/volume, clod count, clod location, etc.) and/or surface irregularities (e.g., surface roughness, levelness, including the detection of ridges and/or valleys), and/or the like within the field.

In several embodiments, the imaging device(s) 104 may be provided in operative association with the agricultural machine 10 such that the imaging device(s) 104 has a field of view directed towards a portion(s) of the field adjacent to the work vehicle 12 and/or the implement 14, such as a portion(s) of the field disposed in front of, behind, and/or along one or both of the sides of the work vehicle 12 and/or the implement 14. For example, as shown in FIG. 1, in one embodiment, an imaging device(s) 104A may be provided at a forward end 38 of the work vehicle 12 to allow the imaging device(s) 104A to capture images and related data of a section of the field disposed in front of the work vehicle 12. Such a forward-located imaging device(s) 104A may allow pre-operation images of the field to be captured for monitoring or determining surface conditions of the field prior to the performance of an agricultural operation (e.g., tillage operation). Similarly, as shown in FIG. 1, a second imaging device(s) 104B may be provided at or adjacent to an aft end 40 of the implement 14 to allow the imaging device(s) 104B to capture images and related data of a section of the field disposed behind the implement 14. Such an aft-located imaging device(s) 104B may allow post-operation images of the field to be captured for monitoring or determining surface conditions of the field after the performance of an agricultural operation (e.g., tillage operation).

It should be appreciated that, in alternative embodiments, the imaging device(s) 104 may be installed at any other suitable location(s) on the work vehicle 12 and/or the implement 14. In addition, it should be appreciated that, in other embodiments, the agricultural machine 10 may only include a single imaging device(s) 104 mounted on either the work vehicle 12 or the implement 14 or may include more than two imaging device(s) 104 mounted on the work vehicle 12 and/or the implement 14. Moreover, it should be appreciated that each imaging device(s) 104 may be configured to be mounted or otherwise supported relative to a portion of the agricultural machine 10 using any suitable mounting/support structure. For instance, in one embodiment, each imaging device(s) may be directly or indirectly mounted to a portion of the work vehicle 12 and/or the implement 14. Specifically, in one embodiment, suitable mounting structure (e.g., mounting arms, brackets, trays, etc.) may be used to support each imaging device(s) 104 out in front of the vehicle 12 or behind the implement 14 (e.g., in a cantilevered arrangement) to allow the imaging device(s) 104 to obtain the desired field of view, including the desired orientation of the device's field of view relative to the field (e.g., a straight-down view oriented generally perpendicular to the surface of the field).

In general, the imaging device(s) 104 may correspond to any suitable device(s) or other assembly configured to capture images of the field. For instance, in several embodiments, the imaging device(s) 104 may correspond to a stereo camera assembly having first and second cameras 106, 108 (FIG. 2) incorporated therein or otherwise forming a part thereof. In such embodiments, the stereo camera assembly may be used to capture both two-dimensional and three-dimensional images of the field. Specifically, each camera may include a lens and a separate image sensor for capturing two-dimensional images. Additionally, by simultaneously capturing an image of the same portion of the field with each camera, the separate images can be combined, compared and/or otherwise processed to extract three-dimensional information about such portion of the field. For example, by comparing the images captured by each camera, a depth image can be generated that allows the scene depth to be determined (e.g., relative to the camera) at each corresponding pixel location within the imaged portion of the field, which, in turn, can be converted into a scene height (or pixel height) at each corresponding pixel location relative to a reference plane (e.g., a reference plane approximating the soil surface). As a result, the relative height of specific features or points within the field may be determined, such as the relative height of residue, clods, ridges, valleys, and/or the like within the field. It should be appreciated that, in addition to a stereo camera assembly or as an alternative thereto, the agricultural machine 10 may include any other suitable type of imaging device(s) 104. For instance, suitable imaging device(s) 104 may also include single or non-stereo cameras, spectroscope cameras, multi-spectrum cameras and/or the like.

Figure 2:
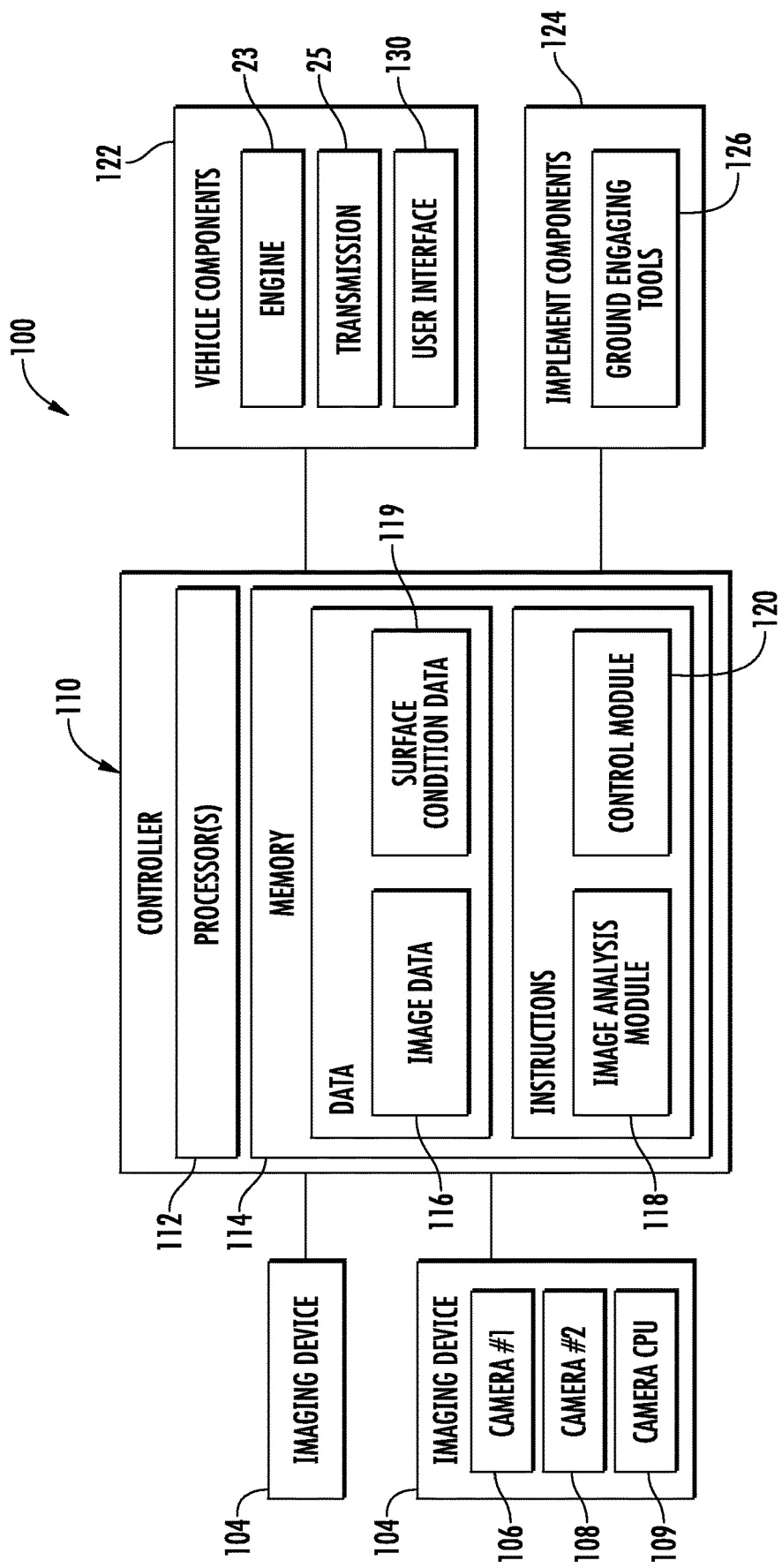
FIG. 2 illustrates a schematic view of one embodiment of a system for monitoring surface conditions within an agricultural field in accordance with aspects of the present subject matter.

Referring now to FIG. 2, a schematic view of one embodiment of an agricultural system 100 for monitoring one or more surface conditions associated with a field is illustrated in accordance with aspects of the present subject matter. The system 100 will generally be described herein with reference to the agricultural machine 10 described above with reference to FIG. 1. However, it should be appreciated by those of ordinary skill in the art that the disclosed system 100 may generally be utilized with agricultural machines having any other suitable machine configuration.

As shown in FIG. 2, the system 100 may include one or more imaging device(s) (e.g., the imaging devices 104 shown in FIG. 1) configured to capture images of a portion (s) of the field disposed adjacent to the work vehicle 12 and or the implement 14. As indicated above, in one embodiment, one or more of the imaging device(s) 104 may correspond to a stereo camera assembly including first and second cameras 106, 108 for capturing both two-dimensional and three-dimensional images of the field. The stereo camera assembly may also include a camera controller or central processing unit (CPU) 109 communicatively coupled to each camera 106, 108. In one embodiment, the camera CPU 109 may be configured to control the operation of each camera 106, 108, such as by controlling the timing and/or rate at which each camera 106, 108 captures images of the field. For instance, the camera CPU 109 may be configured to trigger each camera 106, 108 to simultaneously capture an image of an underlying portion of the field, thereby allowing images of the same portion of the field to be captured from each camera's perspective. Additionally, in one embodiment, the camera CPU 109 may be configured to receive the individual images captured by each camera 106, 108 and execute a suitable image processing algorithm(s) (e.g., software-based and/or hardware-based image processing) to generate a depth image associated with the imaged portion of the field.

The system 100 may further include a computing system 110 communicatively coupled to the imaging device(s) 104. In several embodiments, the computing system 110 may be configured to receive and process the images captured by the imaging device(s) 104 to allow one or more surface conditions of the imaged portions of the field to be determined or estimated. For instance, the computing system 110 may be configured to execute one or more suitable image processing algorithms for detecting one or more conditions relating to crop residue (e.g., percent residue coverage, residue size, residue bunches, residue mat height, etc.), soil clods (e.g., clod size/volume, clod count, clod location, etc.) and/or surface irregularities (e.g., surface roughness, levelness, including the detection of ridges and/or valleys) within the field.

In general, the computing system 110 may comprise any suitable processor-based device known in the art, such as a computing device or any suitable combination of computing devices. Thus, in several embodiments, the computing system 110 may include one or more processor(s) 112 and associated memory device(s) 114 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 of the computing system 110 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 114 may generally be configured to store suitable computer-readable instructions that, when implemented by the processor(s) 112, configure the computing system 110 to perform various computer-implemented functions, such as one or more aspects of the image processing algorithm(s) and/or related method(s) described below. In addition, the computing system 110 may also include various other suitable components, such as a communications circuit or module, one or more input/output channels, a data/control bus and/or the like.

It should be appreciated that, in several embodiments, the computing system 110 may correspond to an existing controller of the agricultural machine 10 or the computing system 110 may correspond to a separate processing device. For instance, in one embodiment, the computing system 110 may form all or part of a separate plug-in module or computing device that is installed relative to the work vehicle 12 or implement 14 to allow for the disclosed system and method to be implemented without requiring additional software to be uploaded onto existing control devices of the work vehicle 12 or implement 14.

In several embodiments, the memory 114 of the computing system 110 may include one or more databases for storing information received and/or generated by the computing system 110. For instance, as shown in FIG. 2, the memory 114 may include an image database 116 storing data associated with the images captured by the imaging device(s) 104, including the images themselves and/or data deriving from the images (e.g., depth images generated based on the images captured by the imaging device(s) 104). Additionally, the memory 114 may include a surface condition database 119 storing data associated with the surface condition(s) being monitored by the computing system 110. For instance, as indicated above, the images and related data deriving from the imaging device(s) 104 may be used to estimate one or more conditions related to surface residue, soil clods, surface irregularities, and/or the like. In such instance, any related "surface condition" data generated by the computing system 110 may be stored within the surface condition database 119 for subsequent processing and/or analysis.

Moreover, as shown in FIG. 2, in several embodiments, the instructions stored within the memory 114 of the computing system 110 may be executed by the processor(s) 112 to implement an image analysis module 118. In general, the image analysis module 118 may be configured to process/analyze the images received from the imaging device(s) 104 and/or the data deriving therefrom to estimate or determine one or more surface conditions associated with the field. In several embodiments, the image analysis module 118 may be configured to execute one or more image processing algorithms for analyzing the images received from the imaging device(s) 104 (e.g., original 2-D images captured by the cameras 106, 108 and/or depth images generated based on the 2-D images) to allow one or more conditions related to surface residue, soil clods, surface irregularities, and/or the like to be identified by the computing system 110. For instance, the two-dimensional images may be analyzed to differentiate crop residue from soil within the imaged portion of the field (e.g., using a texture-based, color-based, and/or spectral-based analysis), thereby allowing the percent crop residue coverage within the field to be approximated. Similarly, the 3-D or depth images can be analyzed to identify the presence of soil clods within the imaged portion of the field, as well as to approximate the size of such clods. In addition, the depth images can be analyzed to identify the height/depth of any ridges/valleys within the field and/or the heights associated with any residue bunches within the field.

Moreover, as will be described below, the image analysis module 118 may also be configured to assess the quality of the images deriving from the imaging device(s) 104 such that only images of a given quality are used to estimate the relevant surface condition(s). For instance, in several embodiments, each input image (e.g., an original 2-D image captured by the cameras 106, 108 and/or a depth image generated based on a pair of 2-D images) may be analyzed in view of one or more quality metrics to assess the quality of the image. Images determined to be of "low-quality" may then be disregard for purposes of determining the relevant surface condition(s) within the field.

Referring still to FIG. 2, in one embodiment, the instructions stored within the memory 114 of the computing system 110 may also be executed by the processor(s) 112 to implement a control module 120. In general, the control module 120 may be configured to electronically control the operation of one or more components of the agricultural machine 10. For instance, in several embodiments, the control module 120 may be configured to control the operation of the agricultural machine 10 based on the monitored surface condition(s) of the field. Such control may include controlling the operation of one or more components 122 of the work vehicle 12, such as the engine 23 and/or the transmission 25 of the vehicle 12 to automatically adjust the ground speed of the agricultural machine 10. In addition (or as an alternative thereto), the control module 120 may be configured to electronically control the operation of one or more components 124 of the implement 14. For instance, the control module 120 may be configured to adjust the operating parameters (e.g., penetration depth, down force/pressure, etc.) associated with one or more of the ground-engaging tools 126 of the implement 14 (e.g., the disc blades 30, shanks 32, leveling blades 34, and/or basket assemblies 36) to proactively or reactively adjust the operation of the implement 14 in view of the monitored surface condition(s).

In several embodiments, the computing system 110 may also be communicatively coupled to a user interface, such as a user interface 130 housed within the cab 24 of the work vehicle 12 or at any other suitable location. The user interface 130 may be configured to provide feedback to the operator of the agricultural machine 10. Thus, the user interface 130 may include one or more feedback devices (not shown), such as display screens, speakers, warning lights, and/or the like, which are configured to communicate such feedback. In addition, some embodiments of the user interface 130 may include one or more input devices (not shown), such as touchscreens, keypads, touchpads, knobs, buttons, sliders, switches, mice, microphones, and/or the like, which are configured to receive user inputs from the operator.

It should be appreciated that, although the various control functions and/or actions will generally be described herein as being executed by the computing system 110, one or more of such control functions/actions (or portions thereof) may be executed by a separate computing system or may be distributed across two or more computing systems (including, for example, the computing system 110 and a separate computing system). For instance, in one embodiment, the computing system 110 may be configured to acquire data from the imaging device(s) 104 for subsequent processing and/or analysis by a separate computing system (e.g., a computing system associated with a remote server). In another embodiment, the computing system 110 may be configured to execute the image analysis module 118 to determine and/or monitor one or more surface conditions within the field, while a separate computing system (e.g., a vehicle computing system associated with the agricultural machine 10) may be configured to execute the control module 120 to control the operation of the agricultural machine 10 based on data and/or instructions transmitted from the computing system 110 that are associated with the monitored surface condition(s).

Figure 3:
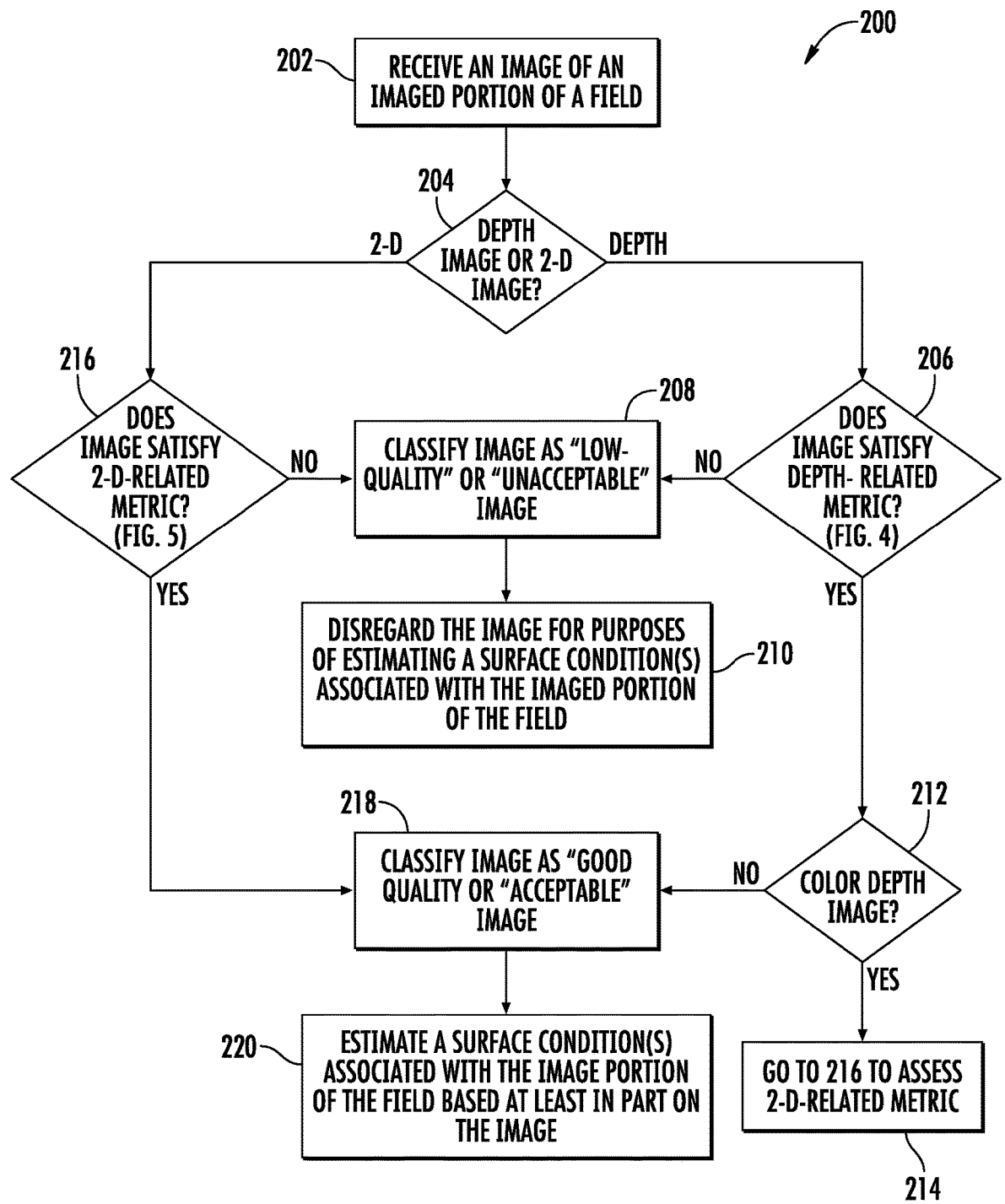
FIG. 3 illustrates a flow diagram providing one embodiment of example control logic for automatically assessing the quality of images is illustrated in accordance with aspects of the present subject matter.

Referring now to FIG. 3, a flow diagram of one embodiment of example control logic 200 that may be executed by the computing system 110 (or any other suitable computing system) for automatically assessing the quality of images is illustrated in accordance with aspects of the present subject matter. Specifically, the control logic 200 shown in FIG. 3 is representative of steps of one embodiment of an algorithm that can be executed to automatically identify or evaluate the quality of candidate images intended to be used for the detection of one or more surface conditions associated with an imaged portion(s) of an agricultural field. Images that are identified as having sufficient quality (e.g., above a given quality threshold(s)) will be classified as acceptable images for detecting the surface condition(s) of the imaged portion(s) of the field while images that are identified as having insufficient quality (e.g., below a given quality threshold(s)) will be classified as unacceptable images and disregarded for purposes of surface condition detection (e.g., by discarding or simply ignoring the image(s) when estimating a given surface condition(s)). Such a quality-based evaluation can ensure that only higher quality images are used for detecting surface conditions, thereby increasing the reliability and accuracy of the estimated surface conditions.

As shown in FIG. 3, at (202), the control logic 200 includes receiving an image of an imaged portion of an agricultural field. For example, as indicated above, the computing system 110 may be communicatively coupled to the imaging device(s) 104, thereby allowing images captured by the imaging device(s) 104 to be transmitted to and received by the computing system 110. In several embodiments, the images received by the computing system 110 may correspond to two-dimensional images (including monochrome and color images) or three-dimensional images, such as depth images providing depth or height information in association with each pixel (or with only percentage of the pixels for lower quality images). For instance, when the imaging device(s) 104 comprises a stereo camera assembly, the imaging device(s) 104 may be configured to pre-process the two-dimensional images captured by each camera 106, 108 (FIG. 2) to form a depth image of the imaged portion of the field, which can then be transmitted to the computing system 110 (e.g., either alone or in combination with the respective two-dimensional images). Alternatively, the imaging device(s) 104 may be configured to transmit the individual two-dimensional images captured by each camera 106, 108 to the computing system 110, in which case the computing system 110 may be configured to combine, compare and/or otherwise process the images to generate the depth image. Regardless, the depth image may generally provide a pixel height value or other depth information for all or a portion of the pixels within the image depending on the quality of the image.

At (204), the control logic 200 includes determining whether the image being processed is a depth image or a two-dimensional image. If, at (204), it is determined that the image corresponds to a depth image, the control logic 200 includes determining, at (206), whether the depth image satisfies a predetermined depth-related image quality metric set for candidate depth images to be used for determining one or more surface conditions associated with the imaged portion of the field. An example of one embodiment of a process flow or algorithm for making such a depth-related quality determination will be described below with reference to FIG. 4. However, in general, the depth-related quality metric may, in several embodiments, be adapted to assess the completeness of the depth image. For instance, the pixels within the depth image may be analyzed to identify the percentage of pixels that include depth information associated therewith (as opposed to the pixels that are not associated with depth information). This percentage generally provides an indication of the completeness of the depth image, with more "complete" depth images (e.g., above a given completeness percentage threshold) being better candidates for use in detecting or estimating one or more surface conditions associated with the imaged portion of the field.

As shown in FIG. 3, if, at (206) it is determined that the depth image does not satisfy the predetermined depth-related quality metric, the control logic 200 indicates, at (208), that the image should be classified as a "low quality" or "unacceptable" image, in which case the image, at (210), will be disregarded for purposes of estimating the relevant surface condition(s) associated with the imaged portion of the field. However, if it is, instead, determined that the depth image does in fact satisfy the depth-related quality metric, the control logic 200 determines, at (212), whether the depth image corresponds to a color depth image (e.g., an RGB-D image). If it is determined that the depth image is a color depth image, then, at (216), the control logic 200 may then evaluate such image in view of any relevant 2-D-related quality metric(s) (e.g., at 216), such as by ignoring the D channel and assessing the R, G, and/or B channels of the depth image via the 2-D-related quality metric(s). However, if the depth image is not a color depth image (and, thus, no 2-D-related quality assessment is to be made), the control logic 200 indicates, at (218), that the image should be classified as a "good quality" or "acceptable" image, in which case the image, at (220), is deemed suitable for use in estimating a surface condition(s) associated with the imaged portion of the field. For instance, the image analysis module 118 (FIG. 2) may be configured to analyze each "acceptable" image via an associated image processing algorithm to estimate one or more surface conditions associated with the imaged portion of the field depicted in such image.

Referring still to FIG. 3, if it is determined that the candidate image corresponds to a two-dimensional image (e.g., at (204)) (or if it is determined that the image corresponds to a color depth image (e.g., at (212))), the control logic 200 includes determining, at (216), whether the image satisfies a predetermined 2-D-related image quality metric set for candidate images intended to be used for determining one or more surface conditions associated with the imaged portion of the field. An example of one embodiment of a process flow or algorithm for making such a 2-D-related quality determination will be described below with reference to FIG. 5. However, in general, the 2-D-related quality metric may, in several embodiments, be adapted to assess one or more parameters associated with the pixels within the image, such as a mean pixel value for the pixels, the standard deviation of the pixel values, the coefficient of variation (CoV) of the pixel values, a saturation parameter for the pixels, and/or the like. Such pixel-related parameters may be assessed individually/separately in association with a given 2-D-related quality metric(s) or in combination in association with a compound or combined 2-D-related quality metric to identify instances of low quality images due, for example, to low-level lighting conditions, dusty conditions, overexposure, etc.

As shown in FIG. 3, if it is determined that the image does not satisfy the 2-D-related quality metric (e.g., at (216), the control logic 200 indicates, at (208), that the image should be classified as a "low quality" or "unacceptable" image, in which case the image, at (210), will be disregarded for purposes of estimating the relevant surface condition(s) associated with the imaged portion of the field. However, if it is, instead, determined that the image does in fact satisfy the 2-D-related quality metric, the control logic 200 indicates, at (218), that the image should be classified as a "good quality" or "acceptable" image, in which case the image, at (220), is deemed suitable for use in estimating a surface condition(s) associated with the imaged portion of the field. For instance, the image analysis module 118 (FIG. 2) may be configured to analyze each "acceptable" image via an associated image processing algorithm to estimate one or more surface conditions associated with the imaged portion of the field depicted in such image.

As indicated above, images deemed "acceptable" are used by the computing system 110 to estimate a surface condition(s) associated with the portion of the field depicted within each of such images, while images deemed "unacceptable" are disregarded for purposes of surface condition detection. Additionally, it should be appreciated that, upon estimating a given surface condition(s) of the imaged portion of the field, the computing system 110 may be configured to perform any number of follow-up actions, including storing data associated with the estimated surface condition(s) within its memory 114 and/or transmitting such data to a separate computing device (e.g., a remote server and/or a computing device associated with a corresponding agricultural machine, such as a vehicle controller).

Such actions may also include generating a notification for display to an operator (e.g., via the associated user interface 130) that provides information associated with the estimated surface condition. For instance, when the estimated surface condition corresponds to a residue-related surface condition(s), the operator notification may provide information associated with percent residue coverage, residue length, residue bunches (e.g., the location, number, and/or height of any detected residue bunches), and/or the like. Similarly, when the estimated surface condition corresponds to a clod-related surface condition(s), the operator notification may provide information associated with the clod locations, the number of clods, the size of the clods (e.g., length, width, height, and/or volume), and/or the like. As yet another example, when the estimated surface condition corresponds to a surface condition(s) associated with surface irregularities, the operator notification may provide information associated with the degree of soil roughness/levelness, the location, number and/or size of surface irregularities (e.g., ridges and valleys), and/or the like.

Additionally, as indicated above, the computing system 110 (or a separate computing system) may be configured to control the operation of an associated agricultural machine based on the estimate surface condition(s) within the field. For instance, when the imaging device(s) 104 are installed on an agricultural machine, the present subject matter may allow for real-time detection of surface conditions within a field as the machine traverses the field during the performance of an agricultural operation. In such an embodiment, adjustments of the operation of the agricultural machine may be made in real-time or on-the-fly in response to the detection of a given surface condition. For example, when the agricultural machine includes a tillage implement configured to perform a tillage operation within the field (e.g., the implement 14 shown in FIG. 1), real-time or on-the-fly adjustments may be made to the tillage parameters associated with the ground-engaging tools of the implement, such as by adjusting the penetration depth, down pressure/force, angle-of-attack, and/or the like of one or more of the ground-engaging tools.

Moreover, in embodiments in which the disclosed system is configured to capture both pre-operation and post-operation images of the field, the computing system 110 may be configured to compare and contrast the pre-operation and post-operation images to assess the effectiveness of an agricultural implement in varying the surface condition(s) of the field. For instance, when a given surface condition is detected in a pre-operation image of a given imaged portion of the field, a corresponding post-operation image of such portion of the field may also be captured to determine whether the surface condition has been improved or degraded following the performance of the agricultural operation.

It should also be appreciated that, in several embodiments, the computing system 110 may be configured to generate a notification for display to the operator (e.g., via the associated user interface 130) when a candidate image is classified as "low quality" or "unacceptable" to alert the operator of such low quality image. Such operator notifications may be particularly advantageous when the current operating conditions are not ideal for capturing images (e.g., low-lighting conditions, dusty conditions, etc.), as repeated instances of "low quality" or "unacceptable" images may indicate to the operator that a corrective action may be required to improve the quality of the images.

Figure 4:
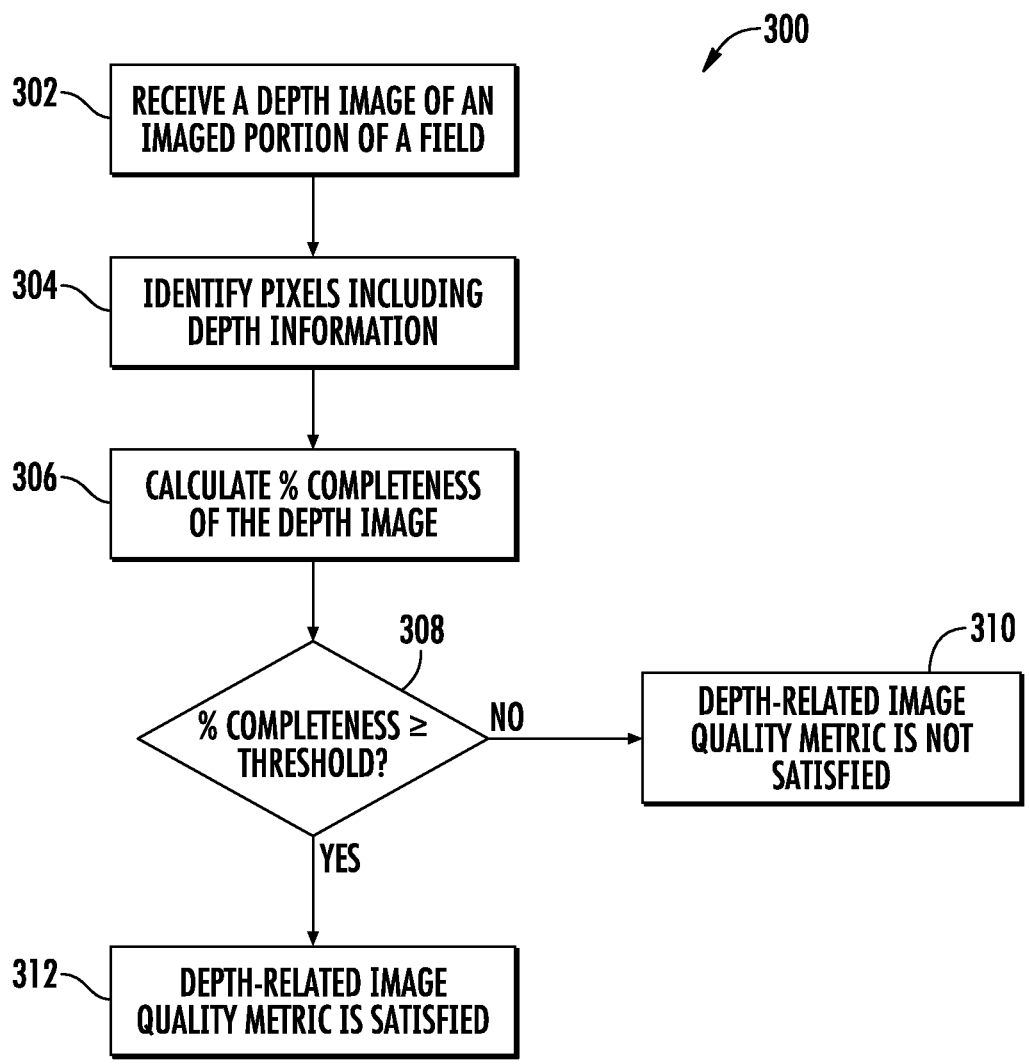
FIG. 4 illustrates a flow diagram of one embodiment of example control logic that may be executed for assessing the quality of depth images depicting portions of an agricultural field in accordance with aspects of the present subject matter.

Referring now to FIG. 4, a flow diagram of one embodiment of example control logic 300 that may be executed for assessing the quality of depth images depicting portions of an agricultural field is illustrated in accordance with aspects of the present subject matter. As shown in FIG. 4, at (302), the control logic 300 includes receiving a depth image of an imaged portion of an agricultural field. For example, as indicated above, the computing system 110 may be communicatively coupled to the imaging device(s) 104 (e.g., a stereo camera assembly), thereby allowing depth images generated by the imaging device(s) 104 to be transmitted to and received by the computing system 110. Alternatively, the imaging device(s) 104 may be configured to transmit the individual two-dimensional images captured by each camera 106, 108 (FIG. 2) to the computing system 110, in which case the computing system 110 may be configured to combine, compare and/or otherwise process the images to generate the depth image.

Additionally, at (304), the control logic 300 includes identifying the pixels within the depth image that include depth information (e.g., a pixel height value) associated therewith. Specifically, an ideal depth image will include depth information associated with each pixel within the image. However, in instances in which the view of one of the cameras 106, 108 is obscured with reference to a given pixel location within the image (e.g., due to dirt on the lens, airborne dust, poor lighting, out-of-view features, etc.) and/or in instances in which an imaged area includes insufficient features to perform stereo matching, one or more pixels (or, more likely, one or more areas of pixels) will not include depth information associated therewith. Within the depth image, such pixels may be classified or categorized as NaN pixels (i.e., "Not a Number" pixels). Since no depth information is available for these pixels, the depth image is considered incomplete or only partially complete.

As shown in FIG. 4, at (306), the control logic 300 includes calculating a percent completeness of the depth image. In several embodiments, the percent completeness of the depth image can be calculated by dividing the number of pixels that include depth information associated therewith by the total number of pixels included within the depth image. In such embodiments, a percent completeness of 100% would indicate that depth information is available for each pixel within the image. Similarly, a percent completeness of 75% would indicate that depth information is available for 75% of the pixels within the image, while the remainder of the pixels are NaN pixels or otherwise have no depth information associated therewith.

Referring still to FIG. 4, at (308), the control logic 300 includes comparing the percent completeness calculated for the depth image to a predetermined percent completeness threshold set for candidate depth images to be used for determining one or more surface conditions associated with the imaged portion of the field. In several embodiments, the percent completeness threshold may correspond to a minimum percent completeness threshold at or above which the depth image will be considered sufficiently "complete." For instance, in one embodiment, the percent completeness threshold may be set as minimum percent completeness threshold ranging from about 60% completeness to about 90% completeness, such as from about 70% completeness to about 90% completeness or from about 75% completeness to about 85% completeness. As shown in FIG. 4, if the percent completeness is not greater than or equal to the percent completeness threshold, then, at (310), it is determined that the depth-related image quality metric is not satisfied, in which case the depth image will be classified as being "unacceptable" for surface condition detection. However, if the percent completeness is greater than or equal to the percent completeness threshold, then, at (312), it is determined that the depth-related image quality metric is satisfied, in which case the depth image will be classified as being "acceptable" for surface condition detection (subject to any other applicable image quality metrics being satisfied).

It should be appreciated that, although the above-described control logic 300 includes a single threshold for the percent completeness of the depth image, two or more thresholds may be used. In such an embodiment, each threshold may be associated with a different control action. For instance, in one embodiment, the percent completeness of the depth image may be compared to first and second thresholds. In such an embodiment, the depth image may, for example, be disregarded when the percent completeness is not greater than or equal to the first percent completeness threshold and an operator notification may be generated when the percent completeness is not greater than or equal to the second percent completeness threshold.

Figure 5:
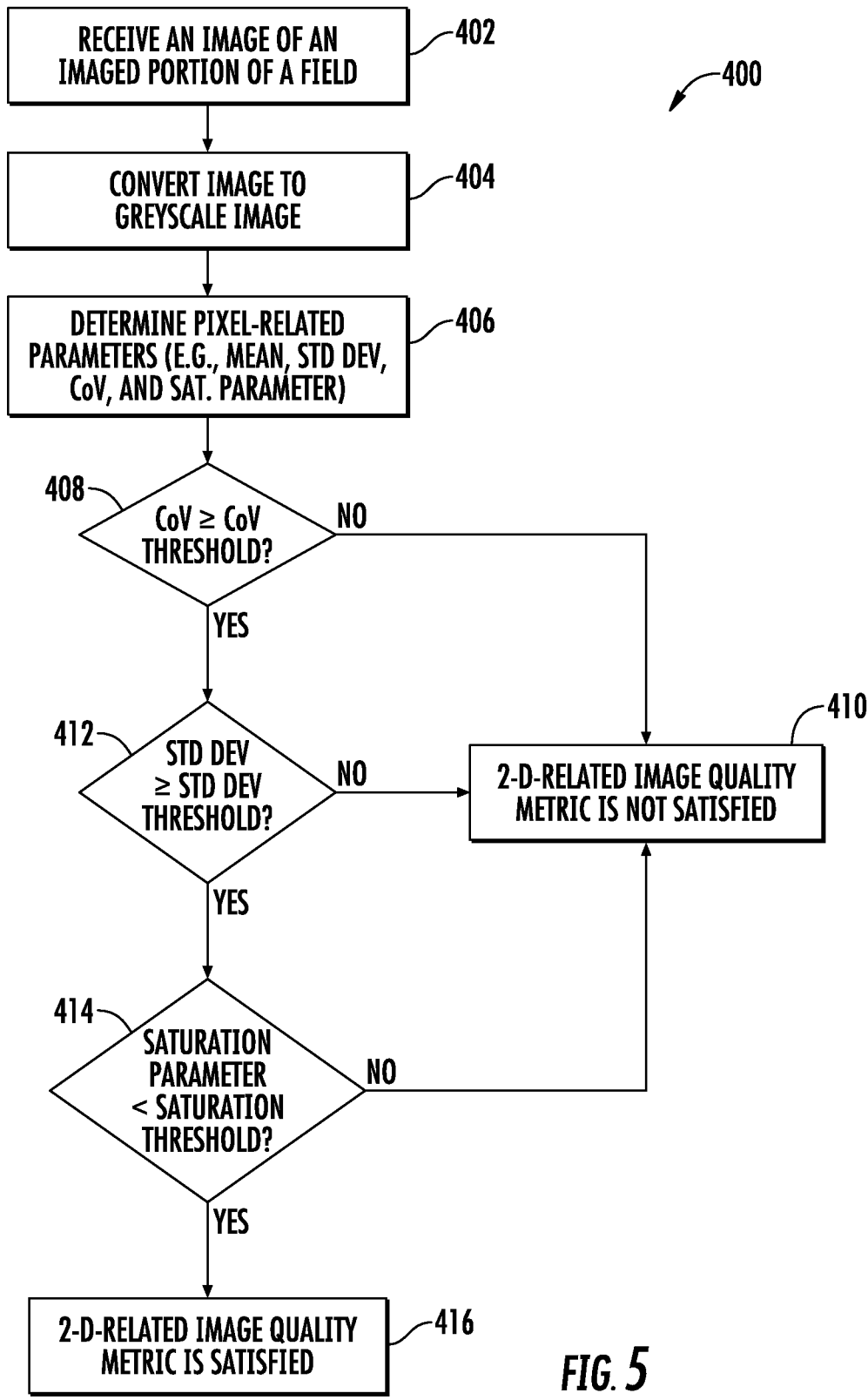
FIG. 5 illustrates a flow diagram of one embodiment of example control logic that may be executed for assessing the quality of images depicting portions of an agricultural field in accordance with aspects of the present subject matter.

Referring now to FIG. 5, a flow diagram of one embodiment of example control logic 400 that may be executed for assessing the quality of images depicting portions of an agricultural field is illustrated in accordance with aspects of the present subject matter. As shown in FIG. 4, at (402), the control logic 400 includes receiving an image of an imaged portion of an agricultural field. For example, as indicated above, the computing system 110 may be communicatively coupled to the imaging device(s) 104, thereby allowing images captured by the imaging device(s) 104 to be transmitted to and received by the computing system 110. In several embodiments, the images received by the computing system 110 may correspond to two-dimensional images (e.g., monochrome and color images) or three-dimensional images, such as color depth images.

Additionally, at (404), the control logic 400 includes converting the image to a greyscale image. For instance, the computing system 110 may be configured to convert the image to a greyscale image having pixel intensity values corresponding to integers from zero to 255, with a pixel value of zero corresponding to black, a pixel value of 255 corresponding to white, and pixel values in-between corresponding to different shades of grey. However, in other embodiments, the image may be analyzed without conversion to greyscale or by converting the image to any other suitable form or format (including single or multi-channel images).

Moreover, at (406), the control logic 400 includes determining one or more pixel-related parameters associated with the image. Specifically, in several embodiments, the computing system 100 may be configured to determine various pixel-related parameters based on the pixel intensity values for evaluating such parameters in view of one or more 2-D-related image quality metrics. For instance, the computing system 110 may be configured to calculate both a mean pixel value for the various pixels within the image and the standard deviation of the pixel values of such pixels.

The computing system 110 may also be configured to calculate one or more additional pixel-related parameters as a function of the mean pixel value and standard deviation of the pixel values of the image. For example, in one embodiment, the computing system 110 may be configured to calculate the coefficient of variation (CoV) of the pixel values for the image as the ratio of the standard deviation to the mean pixel value (i.e., the standard deviation divided by the mean pixel value), thereby providing a measure of the variability of the pixel values in relation to the mean pixel value. Moreover, the computing system 110 may also be configured to calculate a saturation parameter as a function of the mean pixel value and a standard deviation-related value. For instance, in one embodiment, the saturation parameter may be calculated as the summation of the mean pixel value and the standard deviation of the pixel values. However, in other embodiments, the saturation parameter may be calculated as the summation of the mean pixel value and a scaled standard deviation value, where the scaled standard deviation value is equal to the standard deviation of the pixel values multiplied by a scaling factor (e.g., 0.25, 0.5, 0.75, 1.2, 1.5, 2, 3, etc.).

The calculated pixel-related parameters may then be used to evaluate or asses the quality of the image in view of one or more associated 2-D-related image quality metrics. For instance, in the illustrated embodiment, the control logic 400 includes a compound image quality metric that incorporates three individual quality metrics, namely a CoV-related metric, a standard deviation-related metric and a saturation-related metric. In such an embodiment, each respective quality metric must be satisfied individually to satisfy the compound 2-D-related image quality metric. However, in other embodiments, the individual quality metrics may correspond to stand-alone image quality metrics for assessing the quality of a given candidate image. For instance, in one embodiment, one of the quality metrics (e.g., the CoV-related quality metric) may be assessed without evaluating the other two quality metrics (e.g., the standard deviation-related metric and the saturation-related metric). In yet another embodiment, the compound image quality metric may only incorporate two of the above-described quality metrics.

As shown in FIG. 5, at (408), the control logic 400 includes comparing the calculated coefficient of variation for the image to a predetermined CoV threshold set for candidate images intended to be used for determining one or more surface conditions associated with the imaged portion of the field. In general, the CoV threshold may be advantageous for identifying dusty or particulate-filled images that are likely of lower quality. Specifically, dusty images typically reduce the contrast within the image, thereby resulting in a lower standard deviation (and, thus, a lower coefficient of variation). Thus, in several embodiments, the CoV threshold may correspond to a minimum CoV threshold at or above which the image will be considered satisfactory. For instance, in one embodiment, the CoV threshold may be set as a minimum CoV threshold ranging from about 0.10 to about 0.30, such as from about 0.15 to about 0.25 or from about 0.18 to about 0.22. Alternatively, the CoV threshold may correspond to a minimum CoV percentage threshold at or above which the image will be considered satisfactory. For instance, in one embodiment, the calculated coefficient of variation of the image may be scaled by a normalization factor (e.g., a predetermined CoV value, such as a coefficient of variation value of 0.25) to determine a CoV percentage value for the image, with such value being limited to a maximum percentage of 100%. In such instance, the CoV percentage value for the image may be compared to a predetermined minimum CoV percentage threshold (e.g., a threshold ranging from about 70% to about 90%) to assess the quality of the image. As shown in FIG. 5, if the coefficient of variation for the image (or the CoV percentage) is not greater than or equal to the CoV threshold, then, at (410), it is determined that the 2-D-related image quality metric is not satisfied, in which case the image will be classified as being "unacceptable" for surface condition detection.

However, if the coefficient of variation for the image (or the CoV percentage) is, instead, greater than or equal to the CoV threshold, then, at (412), the control logic 400 includes comparing the calculated standard deviation for the image to a predetermined standard deviation threshold set for candidate images intended to be used for determining one or more surface conditions associated with the imaged portion of the field. In general, the standard deviation threshold may be advantageous for identifying dark images that are likely of lower quality. Specifically, images captured under low-lighting conditions typically exhibit a lower standard deviation. Thus, in several embodiments, the standard deviation threshold may correspond to a minimum standard deviation threshold at or above which the image will be considered satisfactory. For instance, in one embodiment, the standard deviation threshold may be set as a minimum standard deviation threshold ranging from about 7 to about 13, such as from about 8 to about 12 or from about 9 o about 11. As shown in FIG. 5, if the standard deviation for the image is not greater than or equal to the minimum standard deviation threshold, then, at (410), it is determined that the 2-D-related image quality metric is not satisfied, in which case the image will be classified as being "unacceptable" for surface condition detection.

In contrast, if the standard deviation for the image is greater than or equal to the standard deviation threshold, then, at (414), the control logic 400 includes comparing the calculated saturation parameter for the image to a predetermined saturation threshold set for candidate images intended to be used for determining one or more surface conditions associated with the imaged portion of the field. In general, the saturation threshold may be advantageous for identifying overexposed images. Specifically, overexposed images typically have a higher mean pixel value associated therewith. By calculating a saturation parameter as a function of the mean pixel value summed together with the standard deviation of the pixel values (or a scaled value of the standard deviation), higher saturation parameter values will be indicative of overexposed images. Thus, in several embodiments, the saturation threshold may correspond to a maximum saturation threshold below which the image will be considered satisfactory. For instance, in one embodiment, the saturation threshold may be set as the maximum potential pixel value for the image (e.g., 255). Alternatively, the saturation threshold may be set as a lower pixel value, such as a pixel value ranging from about 245 to 255 or from about 250 to 255. As shown in FIG. 5, if the saturation parameter for the image is not less than the saturation threshold, then, at (410), it is determined that the 2-D-related image quality metric is not satisfied, in which case the image will be classified as being "unacceptable" for surface condition detection. However, if the saturation parameter for the image is, instead, less than the saturation threshold, the, at (416), it is determined that the 2-D-related image quality metric is satisfied, in which case the image will be classified as being "acceptable" for surface condition detection (subject to any other applicable image quality metrics being satisfied).

As indicated above, the control logic 400 shown in FIG. 5 includes a compound image quality metric that assesses each of a CoV-related quality metric, a standard deviation-related quality metric, and a saturation-related quality metric. However, it should be appreciated that, in other embodiments, the individual quality metrics may correspond to stand-alone image quality metrics or may be combined in any other suitable manner to provide a 2-D-related image quality metric(s) for assessing the quality of candidate images. For instance, the CoV-related quality metric may be used in isolation to determine whether a given image is deemed "acceptable" for surface condition detection. In such instance, if it is determined, at (408) that the coefficient of variation for the image (or the CoV percentage) is greater than or equal to the CoV threshold, then the computing system 110 may determine that the 2-D-related image quality metric is satisfied (e.g., at 416) and classify the image as being "acceptable" for surface condition detection.

It should also be appreciated that, although the above-described control logic 400 includes a single threshold associated with each individual quality metric, two or more thresholds may be used with each respective quality metric. In such an embodiment, each threshold may be associated with a different control action. For instance, in one embodiment, each pixel-related parameter may be compared to first and second thresholds. In such an embodiment, the image may, for example, be disregarded when the pixel-related parameter does not satisfy the first threshold (e.g., by being greater than or less than the threshold as the case may be) and an operator notification may be generated when the pixel-related parameter does not satisfy the second threshold (e.g., by being greater than or less than the threshold as the case may be).

Figure 6:
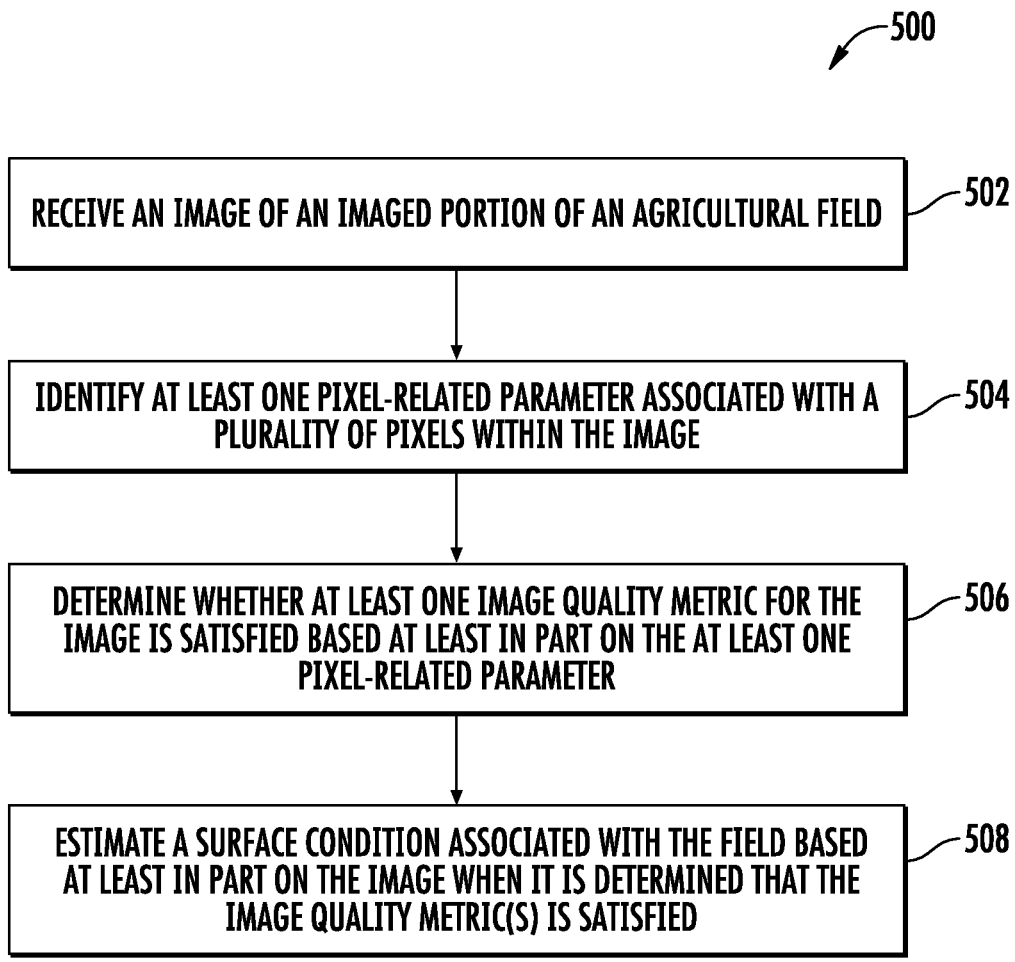
FIG. 6 illustrates a flow diagram of one embodiment of a method for monitoring surface conditions within an agricultural field in accordance with aspects of the present subject matter.

Referring now to FIG. 6, a flow diagram of one embodiment of an agricultural method 500 for monitoring surface conditions within an agricultural field is illustrated in accordance with aspects of the present subject matter. In general, the method 500 will be described herein with reference to the agricultural machine 10 shown in FIG. 1 and the various system components shown in FIG. 2. However, it should be appreciated that the disclosed method 500 may be implemented with agricultural machines having any other suitable machine configurations and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (502), the method 500 may include receiving an image of an imaged portion of an agricultural field. For instance, as described above, the computing system 110 may be communicatively coupled to the imaging device(s) 104, thereby allowing images captured by the imaging device(s) to be transmitted to and received by the computing system 110. Such images may, for example, include depth images or pairs of two-dimensional images that can be compared or otherwise processed to generate corresponding depth images.

Additionally, at (504), the method 500 may include identifying at least one pixel-related parameter associated with a plurality of pixels within the image. As indicated above, the computing system 110 may be configured to analyze each image to identify or calculate one or more pixel-related parameters associated with the image, such as a completeness percentage (e.g., for depth images), a mean pixel value, a standard deviation of the pixel values, a coefficient of variation, a saturation parameter, and/or the like.

Moreover, at (506), the method 500 may include determining whether at least one image quality metric for the image is satisfied based at least in part on the at least one pixel-related parameter. As described above, the computing system 110 may be configured to evaluate the pixel-related parameter(s) in view of one or more image quality metrics, such as a depth-related image quality metric and/or one or more 2-D-related image quality metrics. For instance, in one embodiment, the completeness percentage of a given depth image may be compared to a corresponding completeness percentage threshold to determine whether the associated depth-related image quality metric is satisfied. Similarly, in one embodiment, one or more pixel-related parameters (e.g., the coefficient of variation, the standard deviation, and/or the saturation parameter) may be compared to one or more corresponding thresholds (e.g., a predetermined CoV threshold, standard deviation threshold, and/or saturation threshold) to determine whether the associated 2-D-related image quality metric is satisfied.

Referring still to FIG. 6, at (508), the method 500 may include estimating a surface condition associated with the agricultural field based at least in part on the image when it is determined that the at least one image quality metric is satisfied. Specifically, as indicated above, images deemed "acceptable" may be used by the computing system 110 to estimate a surface condition(s) associated with the portion of the field depicted within each of such images. In contrast, images deemed "unacceptable" will be disregarded by the computing system 110 for purposes of surface condition detection.

It is to be understood that the steps of the control logic 200, 300, 400 and method 500 are performed by a computing system (e.g., computing system 110) upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as the control logic 200, 300, 400 and method 500, is implemented in software code or instructions which are tangibly stored on a tangible computer readable medium. The computing system loads the software code or instructions via a direct interface with the computer readable medium or via a wired and/or wireless network. Upon loading and executing such software code or instructions by the computing system, the computing system may perform any of the functionality of the computing system described herein, including any steps of the control logic 200, 300, 400 and method 500 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An agricultural system for monitoring surface conditions for an agricultural field, the system comprising:
    an agricultural machine configured to travel across an agricultural field;
    one or more imaging devices supported relative to the agricultural machine, the one or more imaging devices being configured to capture images of the agricultural field as the agricultural machine travels across the agricultural field;
    a computing system communicatively coupled to the one or more imaging devices, the computing system being configured to:
        receive, from the one or more imaging devices, an image of an imaged portion of the agricultural field, the imaged portion of the agricultural field being represented by a plurality of pixels within the image;
        determine whether the image comprises a depth image or a two-dimensional image of the imaged portion of the agricultural field;
        select at least one image quality metric to be applied for the image based on the determination of whether the image comprises the depth image or the two-dimensional image;
        identify at least one pixel-related parameter associated with the plurality of pixels within the image;
        determine whether the at least one image quality metric for the image is satisfied based at least in part on the at least one pixel-related parameter; and
        estimate a surface condition associated with the agricultural field based at least in part on the image when it is determined that the at least one image quality metric is satisfied.

2. The agricultural system of claim 1, wherein the computing system is further configured to disregard the image for purposes of estimating the surface condition when it is determined that the at least one image quality metric is not satisfied.

3. The agricultural system of claim 1, wherein;
    the one or more imaging devices comprise a stereo camera assembly;
    the image comprises the depth image of the imaged portion of the agricultural field; and
    the at least one pixel-related parameter comprises a completeness percentage determined based at least in part on a number of the plurality of pixels within the depth image that include depth information associated therewith.

4. The agricultural system of claim 3, wherein the computing system is configured to compare the completeness percentage to a predetermined completeness percentage threshold and determine that the at least one quality metric is satisfied when the completeness percentage is equal to or exceeds the predetermined completeness percentage threshold.

5. The agricultural system of claim 1, wherein the image comprises the two-dimensional image of the imaged portion of the agricultural field and the at least one pixel parameter comprises a coefficient of variation value for the image determined as a function of pixel values for the plurality of pixels within the image, the computing system being configured to compare the coefficient of variation value for the image to a predetermined minimum coefficient of variation threshold, and determine that the at least one image quality metric is satisfied when the coefficient of variation value for the image is greater than or equal to the predetermined minimum coefficient of variation threshold.

6. The agricultural system of claim 1, wherein the image comprises the two-dimensional image of the imaged portion of the agricultural field and the at least one pixel parameter comprises a standard deviation value for the image determined as a function of pixel values for the plurality of pixels within the image, the computing system being configured to compare the standard deviation value for the image to a predetermined minimum standard deviation threshold, and determine that the at least one image quality metric is satisfied when the standard deviation value for the image is greater than or equal to the predetermined minimum standard deviation threshold.

7. The agricultural system of claim 1, wherein the image comprises the two-dimensional image of the imaged portion of the agricultural field and the at least one pixel parameter comprises a saturation parameter for the image determined as a function of pixel values for the plurality of pixels within the image, the computing system being configured to compare the saturation parameter for the image to a predetermined maximum saturation threshold, and determine that the at least one image quality metric is satisfied when the saturation parameter for the image is less than the predetermined maximum saturation threshold.

8. The agricultural system of claim 7, wherein the computing system is configured to determine both a mean pixel value and a standard deviation value for the image based on the pixel values for the plurality of pixels, the computing system being further configured to determine the saturation parameter as a function of the mean pixel value and the standard deviation value for the image.

9. The agricultural system of claim 1, wherein:
    the computing system is configured to determine a plurality of pixel-related parameters for the image, the plurality of pixel-related parameters comprising a coefficient of variation value, a standard deviation value, and a saturation parameter for the image determined as a function of pixel values for the plurality of pixels within the image;
    the at least one image quality metric comprises at least one 2-D-related image quality metric; and
    the computing system is configured to determine that the at least one 2-D-related image quality metric is satisfied when:
        (1) the coefficient of variation value for the image is greater than or equal to a predetermined minimum coefficient of variation threshold;
        (2) the standard deviation value for the image is greater than or equal to a predetermined minimum standard deviation threshold; and
        (3) the saturation parameter for the image is less than a predetermined maximum saturation threshold.

10. The agricultural system of claim 9, wherein:
    the image comprises a color depth image of the imaged portion of the agricultural field;
    the plurality of pixel-related parameters further comprises a completeness percentage determined based at least in part on a number of the plurality of pixels within the depth image that include depth information associated therewith;
    the at least one image quality metric is selected initially such that the least one image quality metric comprises a depth-related image quality metric;
    the computing system is initially configured to compare the completeness percentage to a predetermined completeness percentage threshold, and determine that the depth-related image quality metric is satisfied when the completeness percentage is greater than or equal to the predetermined completeness percentage threshold and;
in the event it is determined that the depth-related image quality metric is satisfied, the computing system is then configured to determine whether the at least one 2-D-related image quality metric is satisfied.

11. The system of claim 1, wherein the at least one image quality metric to be selected differs depending on whether it is determined that the image comprises the depth image or the two-dimensional image.

12. An agricultural method for monitoring surface conditions for an agricultural field, the method comprising:
receiving, with a computing system, an image of an imaged portion of an agricultural field, the imaged portion of the agricultural field being represented by a plurality of pixels within the image;
determining, with the computing system, whether the image comprises a depth image or a two-dimensional image of the imaged portion of the agricultural field;
selecting, with the computing system, at least one image quality metric to be applied for the image based on the determination of whether the image comprises the depth image or the two-dimensional image;
identifying, with the computing system, at least one pixel-related parameter associated with the plurality of pixels within the image;
determining, with the computing system, whether the at least one image quality metric for the image is satisfied based at least in part on the at least one pixel-related parameter; and
estimating, with the computing system, a surface condition associated with the agricultural field based at least in part on the image when it is determined that the at least one image quality metric is satisfied.

13. The agricultural method of claim 12, further comprising disregarding the image for purposes of estimating the surface condition when it is determined that the at least one image quality metric is not satisfied.

14. The agricultural method of claim 12, further comprising initiating a control action to generate an operator notification when it is determined that the at least one image quality metric is not satisfied.

15. The agricultural method of claim 12, wherein receiving the image of the imaged portion of the agricultural field comprises receiving the depth image of the imaged portion of the agricultural field and wherein identifying the at least one pixel-related parameter comprises determining a completeness percentage based at least in part on a number of the plurality of pixels within the depth image that include depth information associated therewith.

16. The agricultural method of claim 15, wherein selecting the at least one image quality metric comprises selecting a depth-related image quality metric based on the image comprising the depth image and wherein determining whether the at least one image quality metric is satisfied comprises:
comparing the completeness percentage to a predetermined completeness percentage threshold; and
determining that the depth-related image quality metric is satisfied when the completeness percentage is greater than or equal to the predetermined completeness percentage threshold.

17. The agricultural method of claim 12, wherein:
the image comprises the two-dimensional image of the imaged portion of the agricultural field;
identifying the at least one pixel-related parameter comprises determining a coefficient of variation value for the image as a function of pixel values for the plurality of pixels within the image;
selecting the at least one image quality metric comprises selecting a 2-D-related image quality metric based on the image comprising the two-dimensional image; and
determining whether the at least one image quality metric is satisfied comprises:
comparing the coefficient of variation value for the image to a predetermined minimum coefficient of variation threshold; and
determining that the 2-D-related image quality metric is satisfied when the coefficient of variation value for the image is greater than or equal to the predetermined minimum coefficient of variation threshold.

18. The agricultural method of claim 12, wherein:
the image comprises the two-dimensional image of the imaged portion of the agricultural field;
identifying the at least one pixel-related parameter comprises determining a standard deviation value for the image as a function of pixel values for the plurality of pixels within the image;
selecting the at least one image quality metric comprises selecting a 2-D-related image quality metric based on the image comprising the two-dimensional image; and
determining whether the at least one image quality metric is satisfied comprises:
comparing the standard deviation value for the image to a predetermined minimum standard deviation threshold; and
determining that the 2-D-related image quality metric is satisfied when the standard deviation value for the image is greater than or equal to the predetermined minimum standard deviation threshold.

19. The agricultural method of claim 12, wherein:
the image comprises the two-dimensional image of the imaged portion of the agricultural field;
identifying the at least one pixel-related parameter comprises determining a saturation parameter for the image as a function of pixel values for the plurality of pixels within the image;
selecting the at least one image quality metric comprises selecting a 2-D-related image quality metric based on the image comprising the two-dimensional image; and
determining whether the at least one image quality metric is satisfied comprises:
comparing the saturation parameter for the image to a predetermined maximum saturation threshold; and
determining that the 2-D-related image quality metric is satisfied when the saturation parameter for the image is less than the predetermined maximum saturation threshold.

20. The agricultural method of claim 12, wherein:
identifying the at least one pixel-related parameter comprises determining a coefficient of variation, a standard deviation, and a saturation parameter for the image as a function of pixel values for the plurality of pixels within the image;
selecting the at least one image quality metric comprises selecting at least one 2-D-related image quality metric; and
determining whether the at least one image quality metric is satisfied comprises:
determining that the at least one 2-D-related image quality metric is satisfied when:
(1) the coefficient of variation value for the image is greater than or equal to a predetermined minimum coefficient of variation threshold;

(2) the standard deviation value for the image is greater than or equal to a predetermined minimum standard deviation threshold; and
(3) the saturation parameter for the image is less than a predetermined maximum saturation threshold.

21. The agricultural method of claim 20, wherein:
receiving the image of the imaged portion of the agricultural field comprises receiving a color depth image of the imaged portion of the agricultural field;
identifying the at least one pixel-related parameter further comprises determining a completeness percentage based at least in part on a number of the plurality of pixels within the color depth image that include depth information associated therewith;
selecting the at least one image quality metric comprises initially selecting a depth-related image quality metric based on the image comprising the color depth image; and
determining whether the at least one image quality metric is satisfied comprises:
   comparing the completeness percentage to a predetermined completeness percentage threshold;
   determining that the depth-related image quality metric is satisfied when the completeness percentage is greater than or equal to predetermined completeness percentage threshold; and
   in the event it is determined that the depth-related image quality metric is satisfied, determining whether the at least one 2-D-related image quality metric is satisfied.

* * * * *